(12) United States Patent
Jewulski et al.

(10) Patent No.: US 7,374,834 B2
(45) Date of Patent: May 20, 2008

(54) GAS FLOW PANELS INTEGRATED WITH SOLID OXIDE FUEL CELL STACKS

(75) Inventors: John R. Jewulski, Naperville, IL (US); Kevin Krist, Palatine, IL (US); Chakravarthy Sishtla, Woodridge, IL (US); Joe Pondo, Bolingbrook, IL (US); Randy Petri, Downers Grove, IL (US); Dave Goodwin, Willow Springs, IL (US)

(73) Assignee: Gas Technology Institute, Des Plaines, IL (US)

(*) Notice: Subject to any disclaimer, the term of this patent is extended or adjusted under 35 U.S.C. 154(b) by 675 days.

(21) Appl. No.: 10/935,531

(22) Filed: Sep. 7, 2004

(65) Prior Publication Data

US 2006/0051644 A1    Mar. 9, 2006

(51) Int. Cl.
*H01M 8/04* (2006.01)
*H01M 8/24* (2006.01)

(52) U.S. Cl. .............................. 429/26; 429/13; 429/38

(58) Field of Classification Search .................. 429/19, 429/26, 34, 38, 39, 13
See application file for complete search history.

(56) References Cited

U.S. PATENT DOCUMENTS

| | | |
|---|---|---|
| 4,490,445 A | 12/1984 | Hsu |
| 4,670,359 A | 6/1987 | Beshty et al. |
| 4,853,100 A | 8/1989 | Hsu |
| 5,366,819 A | 11/1994 | Hartvigsen et al. |
| 5,470,671 A | 11/1995 | Fletcher et al. |
| 5,541,015 A | 7/1996 | Tajima et al. |
| 5,601,937 A | 2/1997 | Isenberg |
| 5,641,585 A | 6/1997 | Lessing et al. |
| 5,763,114 A | 6/1998 | Khandkar et al. |
| 5,830,592 A * | 11/1998 | Akagi ....................... 429/38 X |
| 5,858,314 A | 1/1999 | Hsu et al. |
| 6,083,636 A | 7/2000 | Hsu |
| 6,110,612 A * | 8/2000 | Walsh ....................... 429/34 X |
| 6,183,703 B1 | 2/2001 | Hsu et al. |
| 6,221,522 B1 * | 4/2001 | Zafred et al. ............. 429/34 X |
| 6,440,596 B1 | 8/2002 | Ruhl et al. |
| 6,485,852 B1 | 11/2002 | Miller et al. |

(Continued)

FOREIGN PATENT DOCUMENTS

EP    1 202 366 A2    5/2002

*Primary Examiner*—Stephen J. Kalafut
(74) *Attorney, Agent, or Firm*—Mark E. Fejer (57) ABSTRACT

A generally planar, rectangular solid oxide fuel cell stack having a plurality of fuel cell units, each of the fuel cell units having an anode, a cathode and an electrolyte disposed there between, at least one bipolar separator plate disposed between the anode electrode of one fuel cell unit and the cathode electrode of an adjacent fuel cell unit, an oxidant manifold for delivering oxidant to the cathode electrode, a fuel manifold for delivering fuel to the anode electrode, an anode exhaust gas removal manifold for removing anode exhaust gases from the solid oxide fuel cell stack, and a cathode exhaust gas removal manifold for removing cathode exhaust gases from the solid oxide fuel cell stack. At least one ducted gas flow panel is disposed proximate the fuel cell stack and configured in combination with the fuel cell stack to preheat oxidant gas flowing therethrough and, thus, maintain the fuel cell stack in an operational condition without supplemental heating of the oxidant after entering the at least one ducted gas flow panel.

29 Claims, 10 Drawing Sheets

U.S. PATENT DOCUMENTS 6,489,050 B1  12/2002  Ruhl et al.
6,551,734 B1   4/2003  Simpkins et al.
6,682,841 B1   1/2004  Armstrong et al.
2003/0194596 A1 * 10/2003  Ye et al. .................... 429/38
2003/0207163 A1   11/2003  Chen
2004/0086765 A1 *  5/2004  Florence et al. .......... 429/38 X

* cited by examiner

A 1:1 Stack Aspect Ratio, RAP Air Outlet Temperature, °C
B 1:1 Stack Aspect Ratio, Stack Inlet Temperature, °C
C 2:1 Stack Aspect Ratio, RAP Air Outlet Temperature, °C
D 2:1 Stack Aspect Ratio, Stack Inlet Temperature, °C
E 3:1 Stack Aspect Ratio, RAP Air Outlet Temperature, °C
F 3:1 Stack Aspect Ratio, Stack Inlet Temperature, °C

GAS FLOW PANELS INTEGRATED WITH SOLID OXIDE FUEL CELL STACKS

BACKGROUND OF THE INVENTION

1. Field of the Invention

This invention relates to integrated solid oxide fuel cell systems and thermal management thereof using gas flow panels that absorb thermal radiation from one or more fuel cell stacks. The systems contain at least one gas flow panel that provides oxidant preheating. The systems may also contain additional gas flow panels that provide further oxidant preheating, fuel preheating, fuel pre-reforming, fuel reforming or fuel desulfurization.

2. Description of Related Art

Generally, fuel cell electrical output units are comprised of a stacked multiplicity of individual fuel cell units separated by bi-polar electronically conductive separator plates. Individual fuel cell units are sandwiched together and secured into a single-staged unit to achieve a desired fuel cell power output. Each fuel cell unit generally includes an anode electrode, a cathode electrode, a common electrolyte disposed between the anode electrode and the cathode electrode, and fuel and oxidant gas sources; and the bi-polar separator plate is disposed between the anode electrode of one fuel cell unit and the cathode electrode of an adjacent fuel cell unit, forming an anode reactant chamber on the anode electrode side of the separator plate between the separator plate and the electrolyte and a cathode reactant chamber on the cathode side of the separator plate between the separator plate and the electrolyte of the adjacent fuel cell unit. Both fuel and oxidant gases are introduced through manifolds, either internal or external to the fuel cell stack, to the respective reactant chambers between the separator plate and the electrolyte.

Solid oxide fuel cells have grown in recognition as a viable high temperature fuel cell technology. For one thing, there is no liquid electrolyte with its attending metal corrosion and electrolyte management problems. Rather, the electrolyte of the cells is made primarily from solid ceramic materials so as to be able to survive the high temperature environment, typically as high as about 1000° C. The operating temperature of greater than about 600° C. allows internal reforming to convert hydrocarbon fuels into the hydrogen fuel required for the reaction, promotes cell reactions with non-precious materials, and produces high quality by-product heat for cogeneration or for use in a bottoming cycle. The high temperature of the solid oxide fuel cell, however, places stringent requirements on its materials. Because of the high operating temperatures of conventional solid oxide fuel cells, the materials used in the cell components are limited by chemical stability in oxidizing and reducing environments, by chemical stability of contacting materials, by conductivity, and by thermo-mechanical compatibility.

Planar solid oxide fuel cells have the potential to be more efficient and lower in cost than tubular designs because the cells used have shorter current paths and are simpler to manufacture. However, as suggested above, it is difficult to find suitable low-cost materials for the sealant and interconnect for use at the solid oxide fuel cell operating temperature. Thus, to enable the use of lower cost materials, it is desirable that the operating temperature of the solid oxide fuel cells be reduced.

Effective heat integration between fuel cell stack heat removal and oxidant (air) preheating has been a major challenge for the solid oxide fuel cell. Standard heat-integration schemes, employed by conventional systems, use the cathode gas inside the fuel cell stack for the heat removal and preheat the air feed by gas-to-gas heat exchange with the cathode exhaust gas. Because the temperature gradient across the stack hardware is limited (usually less than about 100° C.), the required cathode flow for the stack heat removal is very large. Typically, a stoichiometric air ratio of 4-10 (depending upon the fuel, fuel processing, and stack size, design and performance) is necessary to provide the cathode gas flow required for the heat removal. This large air flow significantly increases the air preheater size. The large size, in conjunction with the high air discharge temperature required, significantly increases the air preheater cost. This is one major reason for the high cost of solid oxide fuel cell systems. In addition, the large air flow increases the system pressure drop. The combined effect of large flow and high pressure drop increases the air blower size and the auxiliary power consumption. Consequently, the efficiency of the system is reduced.

In larger solid oxide fuel cell (SOFC) systems, the "direct" (e.g. by radiation) transfer of stack-generated heat minimizes the airflow required to cool the stack because heat is transferred from the outside walls of the stack and, thus, reduces the size of components such as piping, ducts, and heat exchangers that use this airflow. Increased power density may also be possible because radiant heat transfer may be able to accommodate higher heat production at higher power density, which reduces capital cost. The parasitic power to run air blowers is also reduced, increasing system efficiency. In addition, the reduced pressure drop in the air passages and across the air compartments due to lower reactant gas flow in larger systems may improve seal durability and allow more flexibility in sizing the gas flow channels.

In smaller solid oxide fuel cell systems (estimated to be <3 kW), heat lost to the surroundings can become a significant fraction of the heat released by the stack. This heat loss increases the difficulty of sustaining the stack temperature, may add to burner duty and lowers system efficiency.

Planar solid oxide fuel cell stacks tend to develop an in-plane, spatial temperature distribution during operation. The temperature gradient is higher for some flow patterns than others. It is particularly high for the relatively easily implemented cross-flow pattern, that is, where the fuel and oxidant gases are introduced into the stack in a cross-flow configuration. Such high temperatures and high temperature gradients increase mechanical stress and accelerate deterioration of solid oxide fuel cell stacks. Smoothing the in-plane stack hardware temperature gradient would have the potential to increase stack life.

U.S. Patent Publication No. 0207163-A1 teaches the use of air preheater panels as a means for addressing thermal management issues encountered in fuel cell stack systems. However, successful thermal management in the disclosed system generally requires the use of at least one pre-burner for boosting the temperature of the air leaving the air preheater panel and entering the fuel cell stack.

Control of a system having modules comprising a combination of fuel cell stack and gas flow panels requires appropriate thermal interaction among the system components. For example, an oxidant outlet heat exchanger may need to operate independently of the gas flow panels so that the panel temperature can stay low enough to maintain effective radiant heat transfer from the fuel cell stack. This may be achieved by locating a control burner for preheating inlet gases remotely from the panels. Remote location of a supplementary burner would also allow for controlling the thermal gradients developed in the stack by controlling the transfer of stack-generated heat alone. An air bypass can be used to assist system control.

SUMMARY OF THE INVENTION

Accordingly, it is one object of this invention to provide a fuel cell stack system that provides thermal management of the fuel cell stack to reduce the size and cost and increase efficiency compared to conventional systems.

It is one object of this invention to provide a fuel cell stack system having reduced stack hardware temperature gradients compared to conventional systems.

It is yet another object of this invention to provide a fuel cell stack system which is easily scalable to a larger system.

It is yet a further object of this invention to provide a fuel cell stack system employing gas flow panels for preheating oxidant to the fuel cell stack without employing supplemental heating means to heat the oxidant after entering the gas flow panels.

It is yet a further object of this invention to provide a fuel cell stack system able to operate in a thermally self-sustainable manner under close to adiabatic conditions.

It is still a further object of this invention to provide a fuel cell stack system comprising at least one gas flow panel having at least one control characteristic such that when the stack performance, current density or gas utilization are altered, the system is able to adjust to new steady state conditions by self adjustment of the operating temperature while maintaining the inlet temperature of air to the gas flow panel constant or by adjustment of the inlet temperature of the air to the gas flow panel while maintaining stack temperature constant.

These and other objects are addressed by a generally planar, rectangular solid oxide fuel cell stack having a plurality of fuel cell units, each of the fuel cell units comprising an anode electrode, a cathode electrode and an electrolyte disposed there between, at least one bipolar separator plate disposed between the anode electrode of one fuel cell unit and the cathode electrode of an adjacent fuel cell unit, oxidant delivery means for delivering oxidant to the cathode electrode, fuel delivery means for delivering fuel to the anode electrode, anode exhaust gas removal means for removing anode exhaust gases from the solid oxide fuel cell stack, and cathode exhaust gas removal means for removing cathode exhaust gases from the solid oxide fuel cell stack. The oxidant delivery means comprises at least one ducted gas flow panel disposed proximate the fuel cell stack and configured in combination with the fuel cell stack to preheat oxidant gas flowing therethrough and, thus, maintain the fuel cell stack in an operational condition without supplemental combustion heating of the oxidant after entering the at least one ducted gas flow panel.

Modeling has shown that the fuel cell stack/gas flow panel configuration of this invention, when properly implemented with respect to gas flows, dimensions, preheating function, panel number, and other factors, can even out the temperature distribution in planar solid oxide fuel cell stacks. This is accomplished by removing heat selectively from stack regions where temperatures are higher than the average stack temperature. The result appears to apply to different reactant flow patterns. The gas flow panels may serve a variety of functions including oxidant preheating, pre-reforming and reforming of fuels as well as other system heating functions. The most significant of these functions is oxidant preheating, as it is oxidant preheating which enables maintenance of the operational condition of the fuel cell stack without supplemental heating of the oxidant subsequent to preheating within the gas flow panel.

Another object of the invention is to include panels for other system functional needs. These gas flow panels may serve a variety of system processes where heat is required including fuel heating, pre-reforming and reforming and possibly desulfurization. These gas flow panels are in addition to at least one panel associated with oxidant preheating. The inclusion of at least one oxidant preheating panels enables maintenance of the operational condition of the fuel cell stack without supplemental heating of the oxidant subsequent to entering the air preheater panel.

The association of the gas flow panels with individual fuel cell stacks to form stack modules allows independent control of each stack in systems involving multiple stacks. In contrast thereto, conventional designs that radiate to an external system wall instead of panels adjacent to the stacks do not control in-plane temperature distributions when multiple stacks are involved.

The reduced system airflow in larger systems employing this invention enables a reduction in the oxidant inlet temperatures to the stack without causing as much of a temperature variation across the stack hardware as would occur in a system that only relied on conventional airflow for stack cooling. This reduction in reactant gas inlet temperature has the potential to reduce or eliminate the operation of a supplementary burner.

The gas flow panels of this invention effectively lower heat loss by decreasing the hardware temperature within a short distance from the stack sidewall. Thus, the gas flow panels, while providing reactant heating, behave similarly to high quality insulation. This can increase efficiency and/or lower cost, particularly for small systems where heat loss to the surroundings can be significant.

For both large and small systems, the location of efficiently heated panels close to the stack minimizes the overall system volume.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

Figure 1:
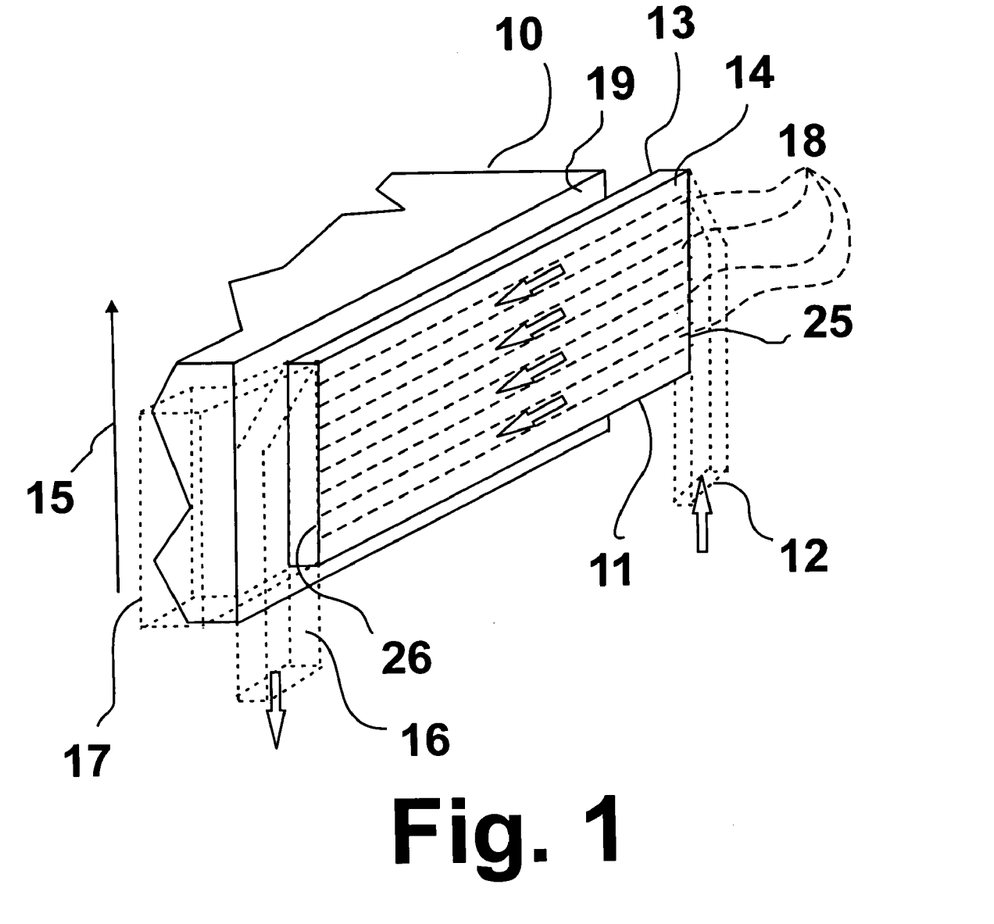
FIG. 1 is a schematic diagram of a partial fuel cell stack with a single gas flow panel in accordance with one embodiment of this invention.
Figure 2:
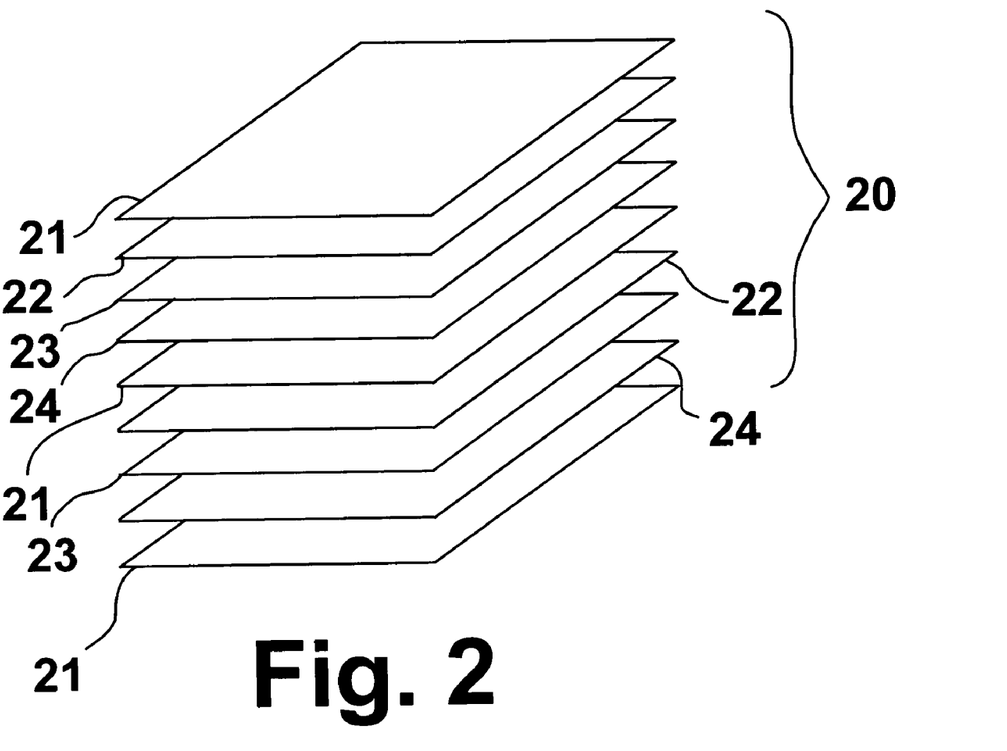
FIG. 2 is an exploded view of a portion of a fuel cell stack.

As shown in FIG. 2, a solid oxide fuel cell stack 20 suitable for use in the system of this invention comprises a plurality of generally planar, rectangular solid oxide fuel cell units, each said solid oxide fuel cell unit comprising an anode electrode 22, a cathode electrode 24 and an electrolyte 23 disposed there between. A bipolar separator plate 21 is disposed between the anode electrode of one solid oxide fuel cell unit and the cathode electrode of an adjacent solid oxide fuel cell unit. The fuel cell units are stacked and provided with endplates, forming half cells at each end and clamped to provide rigid structure to the fuel cell stack. For purposes of this disclosure, it should be noted that all discussions regarding orientation of the components of the system of this invention are relative to the stacking direction of the fuel cell stack as indicated by arrow 15 in FIG. 1. Thus, the top and bottom of the fuel cell stack are defined by the endplates and the sides 19 of the fuel cell stack are formed by the stacked fuel cell units between the endplates.

Figure 3:
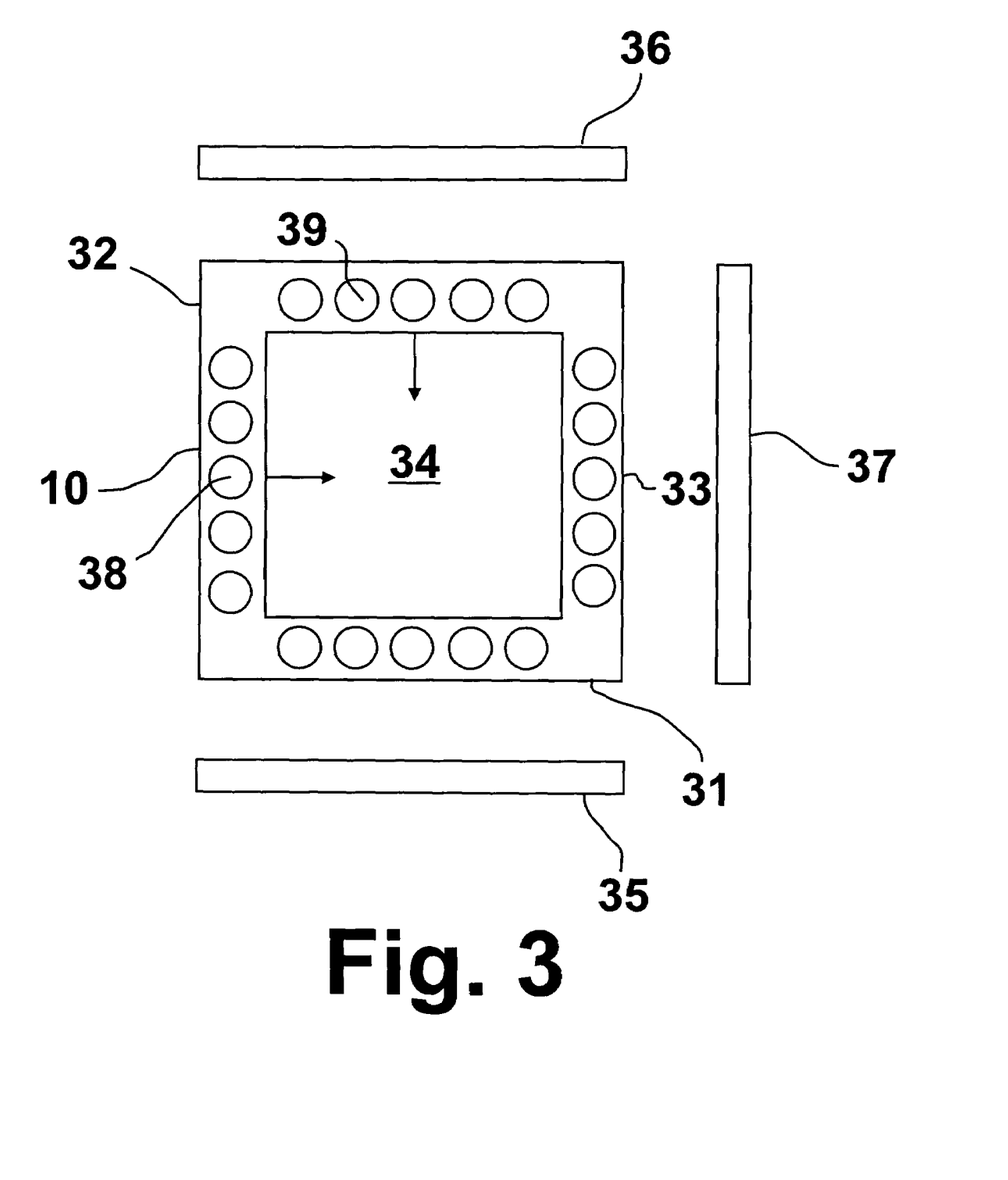
FIG. 3 is a plan view of a fuel cell stack with a plurality of gas flow panels in accordance with one embodiment of this invention.

To generate electricity in the solid oxide fuel cell, a fuel gas is provided by fuel gas delivery means to the anode electrode and an oxidant gas, typically air, is provided by oxidant delivery means to the cathode electrode. The fuel gas delivery means and the oxidant gas delivery means may comprise either internal manifolds, external manifolds or combinations of internal and external manifolds. Fuel gas may be provided relative to the oxidant gas in a cross-flow, co-flow or counter-flow configuration. In accordance with one particularly preferred embodiment of this invention, solid oxide fuel cell stack 10, as shown in FIG. 3, comprises a fuel gas inlet side 30, an oxidant gas inlet side 32, an anode exhaust gas outlet side 31 disposed opposite the fuel gas inlet side 30, a cathode exhaust gas outlet side 33 disposed opposite the oxidant gas inlet side 32 and a centrally disposed active region 34. As shown, fuel gas inlet side 30 is disposed on a side of fuel cell stack 20 adjacent to oxidant gas inlet side 32, thereby providing a cross-flow configuration of fuel gas and oxidant gas within the fuel cell stack. Reaction of the fuel and oxidant occurs at the anode electrode, resulting in the formation of anode exhaust gases comprising water and residual fuel, which anode exhaust gas is removed from the fuel cell stack by anode exhaust gas removal means, which may be in the form of internal or external manifolds. In cases where the fuel gas is a reformed fuel, other components, such as CO and $CO_2$, may also be present in the anode exhaust gas. Excess oxidant at the cathode electrode is removed from the fuel cell stack by cathode exhaust gas removal means, which also may be in the form of internal or external manifolds.

As previously indicated, planar solid oxide fuel cell stacks have a tendency to develop an in-plane, spatial temperature distribution during operation, which temperature gradient is particularly high for the relatively easily implemented cross-flow pattern shown in FIG. 3. Modeling has shown that a stack/gas flow panel configuration, when properly implemented with respect to gas flows, dimensions, preheating function, panel number, and other factors, can even out the temperature distribution in planar solid oxide fuel cell stacks. This is accomplished by removing heat selectively from stack regions where temperatures are much higher than the average stack temperature. The result appears to apply to different reactant flow patterns.

Figure 5:
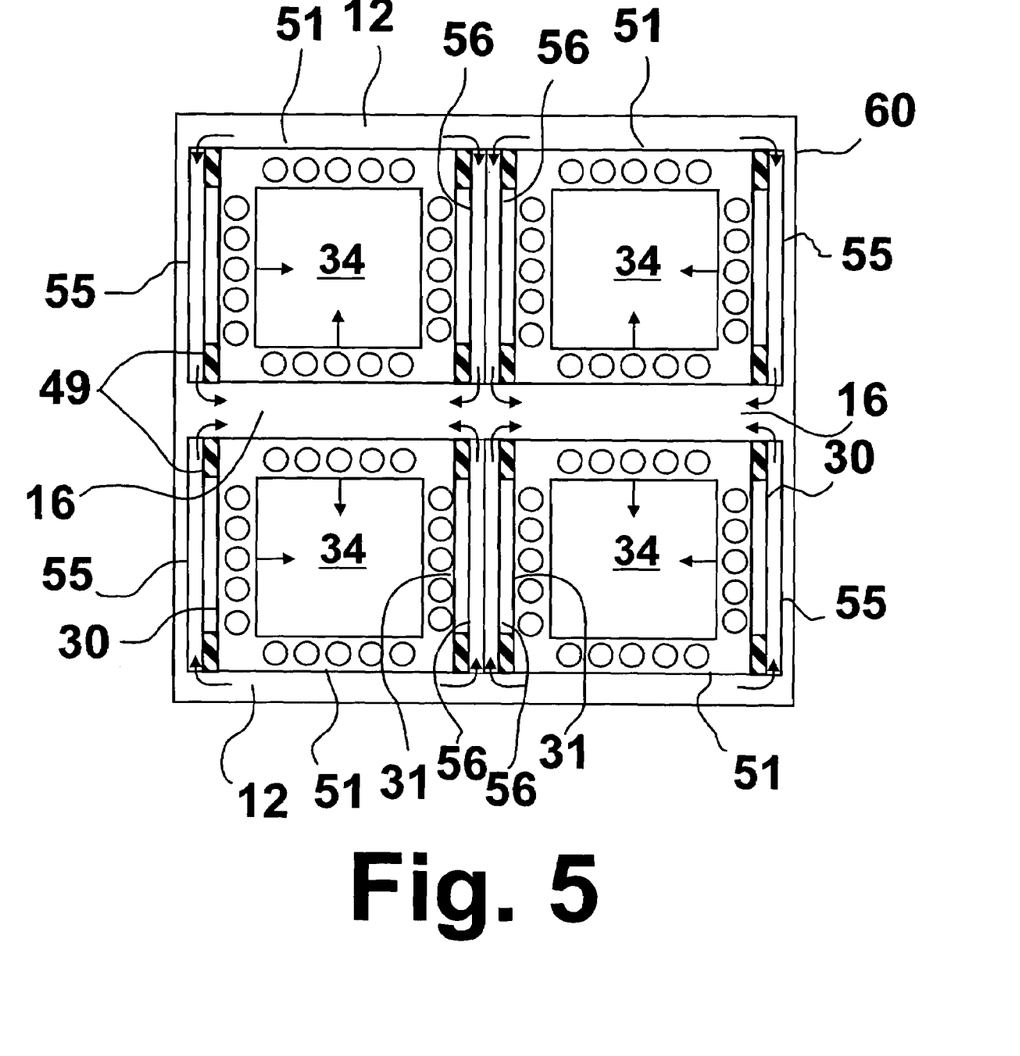
FIG. 5 is a schematic plan view of a multi-stack system in accordance with one embodiment of this invention.

The association of the gas flow panels with individual stacks allows independent control of each stack in systems involving multiple stacks as shown in FIG. 5. Designs that radiate to an external system wall instead of panels adjacent to stacks do not control in-plane temperature distributions when multiple stacks are involved.

The reduced airflows in larger systems enable a reduction in the oxidant inlet temperatures to the stack without causing as much of a temperature variation across the stack hardware as would occur in a system that only relied on airflow for stack cooling. The reduction in reactant gas inlet temperature along with the high degree of radiant heating within the gas flow panel has the potential to reduce or eliminate the operation of a supplementary burner.

To provide the desired improvements in operation over conventional solid oxide fuel cell systems, the fuel cell system of this invention as shown in FIGS. 1 and 3, comprises at least one gas flow panel 11 disposed proximate one side 19 of solid oxide fuel cell stack 20. The at least one gas flow panel 11, 35, 36, 37, which absorbs radiation from the fuel cell stack, can carry out a significant part of the system heating functions (e.g., air preheating, fuel heating, fuel pre-reforming, fuel reforming, or desulfurization). In larger solid oxide fuel cell systems, the "direct" radiant transfer of stack-generated heat minimizes the airflow required to cool the stack, thereby enabling reductions in the size of components such as piping, ducts, and heat exchangers that use this airflow relative to conventional systems. Increased power density may also be possible because radiant heat transfer may be able to accommodate higher heat production at higher power density. This, in turn, reduces capital cost. The parasitic power to run air blowers is also reduced, increasing system efficiency.

In smaller solid oxide fuel cell systems (estimated to be <3 kW), heat lost to the surroundings can become a significant fraction of the heat released by the stack. This heat loss (1) increases the difficulty of sustaining the stack temperature, (2) may add to burner duty, and (3) lowers system efficiency. The gas flow panels of this invention effectively lower heat loss by decreasing the hardware temperature within a short distance from the stack sidewall. Thus, the gas flow panels, while conducting reactant heating, behave similarly to high quality insulation. This can increase efficiency and/or lower cost.

The crux of this invention is a gas flow panel in the form of a ducted oxidant preheater panel for delivering oxidant to the fuel cell stack whereby the fuel cell stack is maintained in an operational condition without supplemental combustion heating of the oxidant after entering the ducted oxidant preheater panel. FIG. 1 shows a portion of a fuel cell stack system having a single gas flow panel 11. Gas flow panel 11, preferably shaped as a rectangular duct or ducted annulus section, comprises a front wall 13 facing a side wall 19 of fuel cell stack 10, a back wall 14 spaced apart from and connected to the front wall 13, forming at least one gas flow duct 18 there between. The front and back walls of gas flow panel 11 are constructed of a thermally conductive material, preferably a metal alloy sheet, having a thickness in the range of about 50 mils to about 200 mils. Thermal radiation emissivity characteristics of the gas flow panel play a critical role in the preheater panel operation. In accordance with a particularly preferred embodiment of this invention, gas flow panel 11 is constructed of a material having a thermal emissivity of at least about 0.3. In accordance with a particularly preferred embodiment of this invention, the thermal emissivity is in the range of about 0.3 to about 1.0. Gas flow panel 11 further comprises a flow gas inlet manifold 12 in fluid communication with an inlet end 25 of the at least one gas flow duct 18 and at least one flow gas outlet manifold 16, 17 in fluid communication with the outlet end 26 of the at least one gas flow duct 18. In accordance with one embodiment of this invention, flow gas outlet manifold 16 is in fluid communication with an external stack flow gas inlet manifold (not shown) from which the flow gas is introduced into the fuel cell stack. In accordance with another embodiment of this invention, flow gas outlet manifold 17 is in fluid communication with an internal stack flow gas manifold 38, 39 as shown in FIG. 3 through which the flow gas is communicated to the respective electrodes, i.e. oxidant gas to the cathode electrodes and fuel gas to the anode electrodes.

In operation, a relatively cool oxidant gas enters flow gas inlet flow manifold 12 from which it then flows into the at least one gas flow duct 18 of gas flow panel 11. The design of gas flow panel 11 and its proximity to the side of fuel cell stack 10 are such that the oxidant gas exiting from the at least one gas flow duct 18 has a gas temperature up to about 400° C. higher than the temperature of the relatively cool oxidant gas entering flow gas inlet flow manifold 12. To achieve such an increase in oxidant gas temperature, the oxidant gas is preferably uniformly distributed within gas flow panel 11, preferably by means of a plurality of gas flow ducts 18 disposed therein. We have also determined that the direction of flow of the oxidant gas within the gas flow panel 11 relative to the stacking direction 15 of the fuel cell stack is critical to achieving the desired fuel cell system operational condition. In particular, maintaining the proper operational condition of the fuel cell system without supplemental combustion heating of the oxidant after entering the ducted oxidant preheater panel requires an oxidant flow pattern substantially perpendicular to the stacking direction 15 of the fuel cell stack as shown in FIG. 1. Accordingly, as shown in FIG. 1, gas flow ducts 18 within gas flow panel 11 are oriented in a direction substantially perpendicular to the stacking direction 15 of the solid oxide fuel cell stack 10.

We have determined that the relationship between the temperature of the oxidant gas entering gas flow panel 11, the temperature of the oxidant gas exiting the gas flow panel and the average temperature of the stack side wall 19 is approximately linear. For example, in one experiment, the following linear equation was fitted to the data, for an average temperature of fuel cell stack side wall 19 in the range of about 600° C. to about 800° C. and inlet oxidant (air) temperature in the range from about 50° C. to about 300° C., 0.3" (0.75 cm) spacing between stack side wall 19 and front wall 13, rectangular gas flow ducts 18 having dimensions 5.5"×5.5"×0.2", and an air flow of 27 slpm:

$$T_{(26)}=0.55 \cdot T_{(25)}+0.93 \cdot T_{(19)}-300° C. \quad (1)$$

The numerical coefficients of Equation (1) vary with the dimensional and thermal characteristics of the gas flow panel. The heat is transferred from the stack sidewall 19 to the front wall 13 and back wall 14 of the gas flow panel primarily by means of thermal radiation and, to a lesser extent, by convection. The process gas flowing in the gas flow panel 11 is heated by means of convection and, to a lesser extent, thermal radiation. In general, thermal emissivity of 0.3 or higher for the back wall 14, front wall 13 and stack sidewall 19 is preferred. However, in some implementations, low thermal emissivity is preferred for the selected wall sides. By low thermal emissivities, we mean emissivities of less than about 0.3.

Also critical to maintaining the operational conditions of the fuel cell stack system of this invention is the distance between front wall 13 and back wall 14 of gas flow panel 11. In accordance with a particularly preferred embodiment of this invention, the distance between front wall 13 and back wall 14 of gas flow panel 11 is in the range of about 0.1" (0.25 cm) to about 0.5" (1.25 cm). The low end of the spacing range is limited by the pressure drop in the gas flow panel. The high end of the spacing range is limited by the effectiveness of convective heat transfer to the gas in the panel. In general, wall spacing closer to the low end of the range is preferred.

Yet another element critical to maintaining the operational conditions of the fuel cell stack system of this invention is the distance between the stack sidewall 19 and the gas flow panel 11. The low end of the spacing range between the stack sidewall 19 and the front wall 13 of gas flow panel 11 is limited by the requirement that there be no electrical contact between these walls. In accordance with a particularly preferred embodiment of this invention, the distance between stack sidewall 19 and the front wall 13 of gas flow panel 11 is at least about 0.1" (0.25 cm) and preferably in the range of about 0.1" (0.25 cm) to about 0.5" (1.25 cm). The stack and pre-heater manufacturing tolerances and relative movement of assembly parts during start-up, operation, and thermal cycling also limit the low end of the spacing range. In accordance with one preferred embodiment of this invention, insulating inserts 49, as shown in FIG. 5, are placed between stack sidewall 19 and front wall 13 of gas flow panel 11 in locations (e.g., edges of the wall) such that thermal radiation heat transfer between walls is not obstructed. The high end of the spacing range between stack sidewall 19 and front wall 13 is limited by the reduction of thermal radiation heat transfer between walls with increased spacing.

Figure 11:
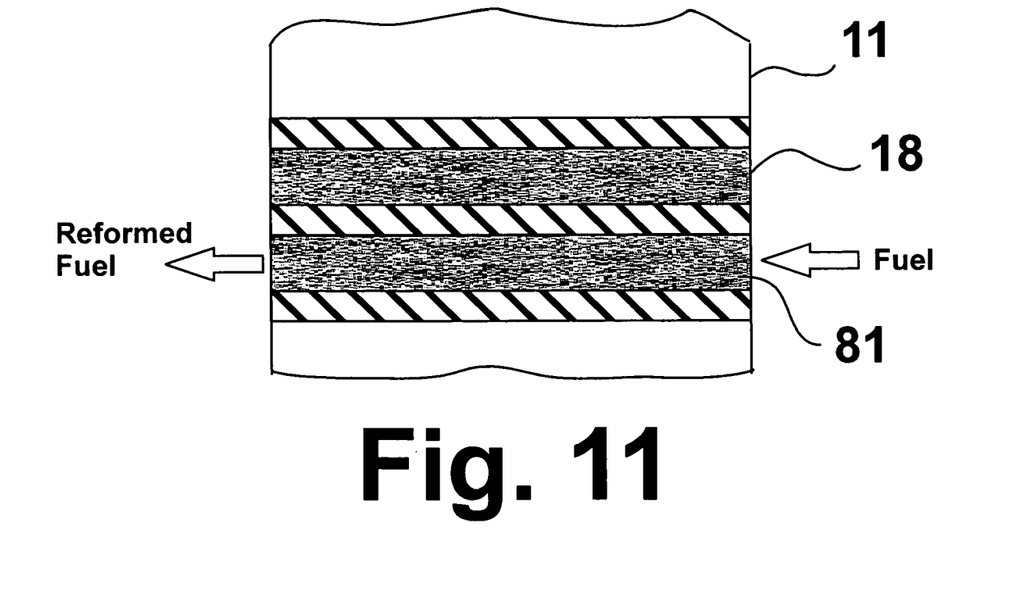
FIG. 11 is a partial lateral cross-sectional view of a gas flow panel having at least one gas flow duct containing a reforming catalyst in accordance with one embodiment of this invention.

In accordance with one embodiment of this invention, in addition to preheating oxidant, as previously indicated, the gas flow panels may be employed for other purposes, including reforming of a fuel to form $H_2$. Accordingly, as shown in FIG. 11, the gas flow ducts 18 of the gas flow panel 11 may contain a reforming catalyst 81, thereby enabling reforming of the fuel as it flows through the gas flow panel.

Figure 12:
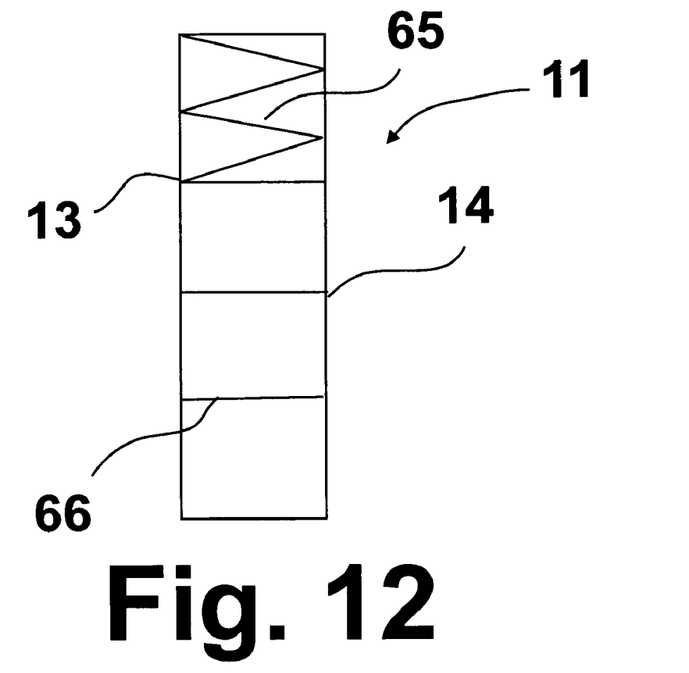
FIG. 12 is a schematic end view of a gas flow panel showing at least one form of thermal connection between the front and back walls of the panel.

In accordance with one preferred embodiment of this invention, front wall 13 of gas flow panel 11 is thermally connected with back wall 14 by means of a thermally conductive flow field insert, for example horizontal ribs 66 or horizontally corrugated metal sheets 65, as shown in FIG. 12, for the purpose of enhancing heat transfer to gas flowing in the panel and maintaining horizontal flow of gas.

Figure 8:
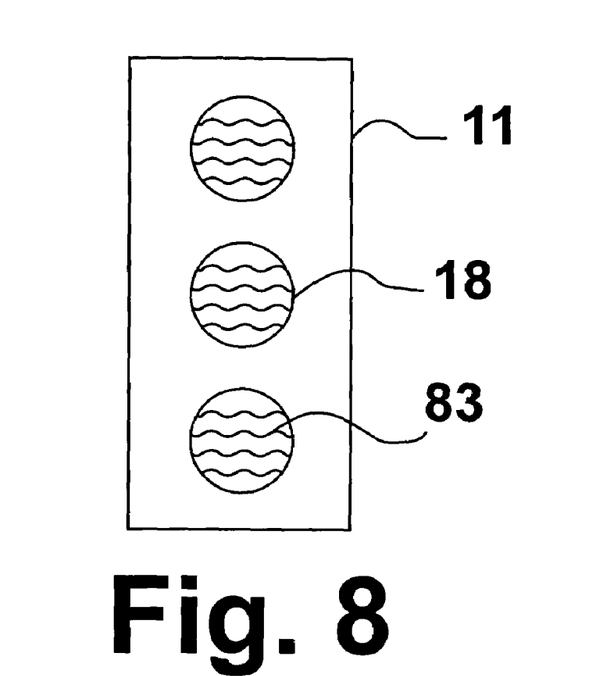
FIG. 8 is an end view of a duct in a gas flow panel having a corrugated insert in accordance with one embodiment of this invention.
Figure 9:
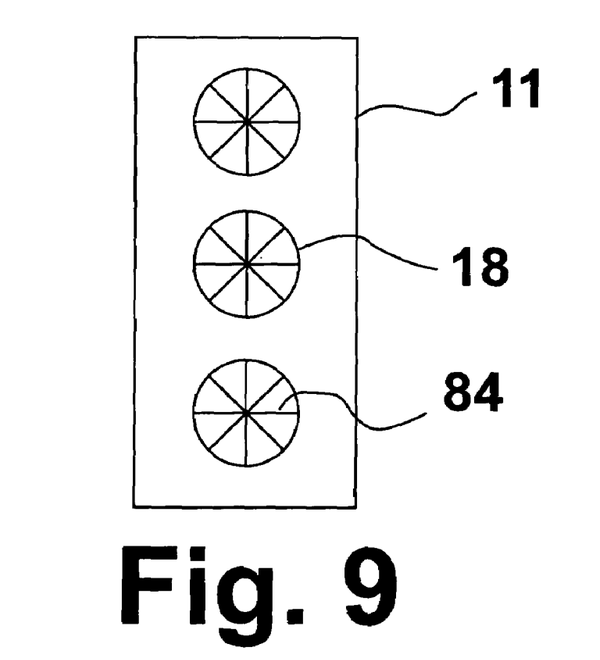
FIG. 9 is an end view of a duct in a gas flow panel having a finned insert in accordance with one embodiment of this invention.

In accordance with another preferred embodiment of this invention, heat transfer to a process gas, such as oxidant, flowing through gas flow ducts 18 of gas flow panels 11 is enhanced by the use of removable inserts, such as corrugated sheets 83 as shown in FIG. 8 and finned elements 84 as shown in FIG. 9.

Figure 10:
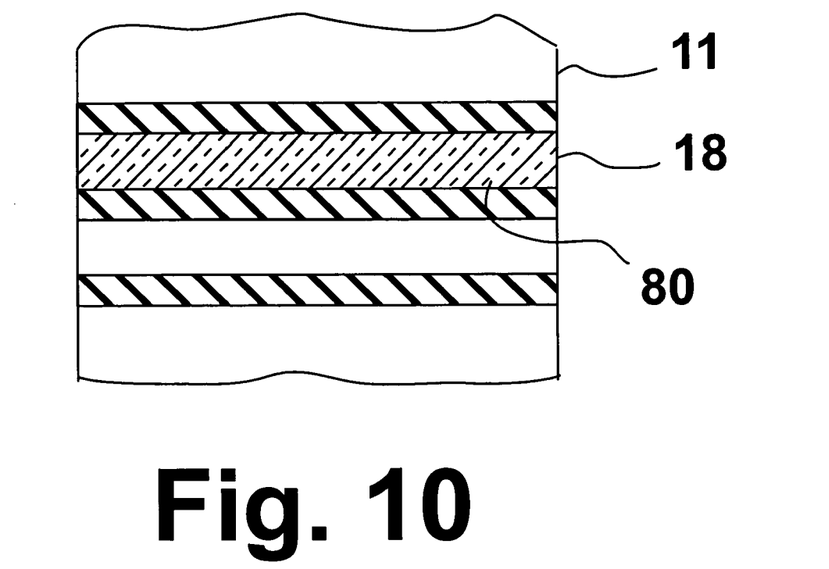
FIG. 10 is a partial lateral cross-sectional view of a gas flow panel having at least one gas flow duct containing insulation in accordance with one embodiment of this invention.
Figure 13:
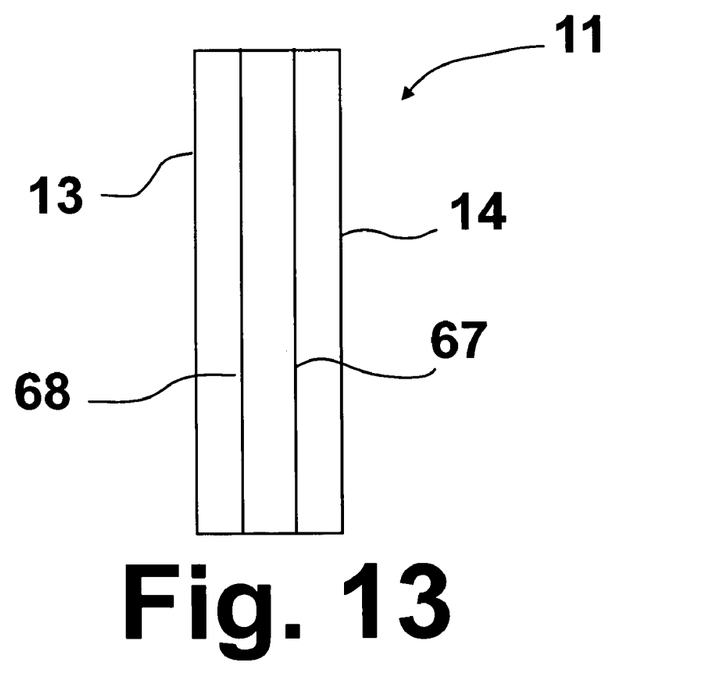
FIG. 13 is a schematic end view of a gas flow panel having at least one intermediate wall disposed between the front and back walls of the panel in accordance with one embodiment of this invention.

In accordance with another preferred embodiment of this invention, gas flow panel 11 comprises at least one additional wall element 67, 68, as shown in FIG. 13, disposed between and oriented parallel to front wall 13 and back wall 14, thereby further enhancing heat transfer to gas flowing between the walls and reducing the temperature of back wall 14. These additional walls act as thermal radiation shields for the back wall 14, thereby limiting heat loss therefrom. In accordance with one embodiment of this invention, back wall 14 and the intermediate walls 67 proximate to back wall 14 preferably have low thermal emissivity, on the order of about 0.1 to about 0.2. In accordance with yet another embodiment of this invention, insulation is provided adjacent to both sides of back wall 14, thereby further reducing heat loss from the back wall. In accordance with yet a further embodiment of this invention, thermal management of the fuel cell stack is further enhanced by the employment of an insulating material 80 disposed within at least a portion of the gas flow ducts 18 disposed within gas flow panel 11 as shown in FIG. 10.

Although described herein as having a substantially rectangular geometry, it will be apparent to those skilled in the art that other geometries, such as annular or a combination of annular and rectangular, may be employed and such additional geometries are deemed to be within the scope of this invention. In accordance with one embodiment of this invention, gas flow panel 11 is constructed of a plurality of sub-panels, thereby enabling selective removal of heat from the fuel cell stack 10.

Figure 4:
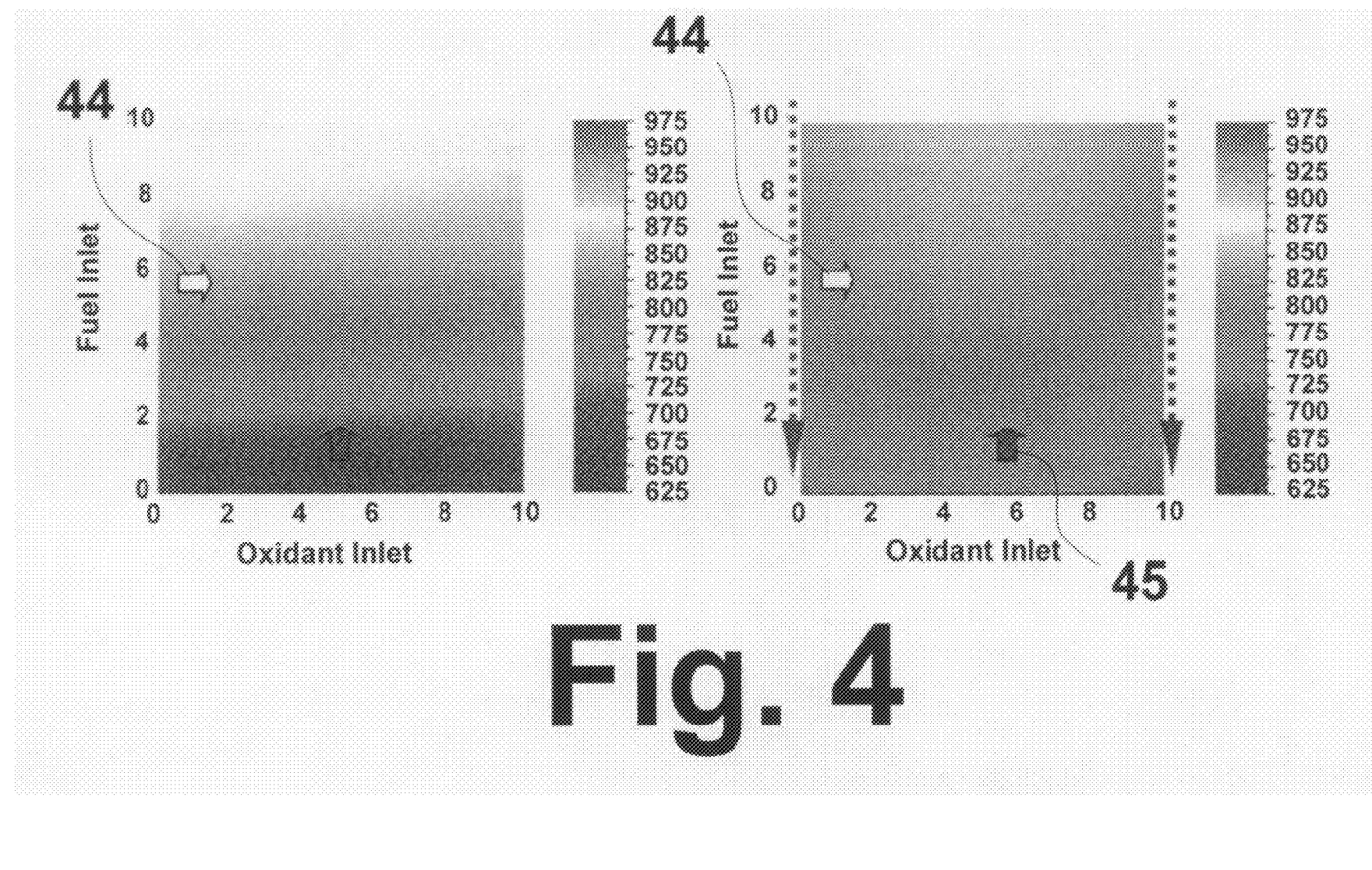
FIG. 4 is a diagram showing a simulated temperature distribution in the active area of a 4"×4" cross-flow stack fed with $H_2$/air for an air cooled stack operated at 300 mA/cm$^2$.

The effect of this invention on heat distribution within the fuel cell stack is shown in FIG. 4. In the left side of FIG. 4, a simulated temperature distribution in the active area 34 of a 4"×4" cross-flow solid oxide fuel cell stack fed with $H_2$ and air is shown for the air cooled stack operated at 300 mA/cm$^2$. The direction of fuel flow is indicated by arrows 44 and the direction of oxidant flow is indicated by arrow 45. The spread between minimum and maximum hardware temperature in this stack is ~229° C. However, as shown in the right side of FIG. 4, this temperature spread is reduced to 138° C. by placing two gas flow panels in accordance with one embodiment of this invention dedicated to air pre-heating in the locations facing fuel inlet 30 and exhaust gas outlet side 31 of the solid oxide fuel cell stack 10 as shown in FIG. 3.

As previously indicated, for embodiments of this invention in which the at least one gas flow panel is used as an oxidant preheater panel, the flow direction of the oxidant in the panel is critical for proper functioning of the solid oxide fuel cell system. In accordance with one preferred embodiment of this invention, in addition to flowing perpendicular to the stacking direction of the fuel cell stack, the oxidant flows parallel to the direction of the generally declining stack hardware temperature on the stack sidewall facing the gas flow panel. As a result, more heat is transferred from the fuel cell stack to the gas flow panel in the locations where stack temperatures are above average.

Yet another element of the fuel cell stack system of this invention is the width-to-length ratio (aspect ratio) of the fuel cell stack. In stacks operated with gas flow panels, the temperature distribution in the stack may improve with aspect ratios higher than 1:1. In embodiments of a solid oxide fuel cell stack used to demonstrate the temperature distributions shown in FIG. 4, the span between the minimum and maximum temperatures of the active area of the stack is reduced to about 49° C. for a stack with 3:1 aspect ratio, with fuel inlet side 30 of the stack being three times longer than oxidant gas inlet side 32.

In the solid oxide fuel cell system in accordance with one embodiment of this invention, the fuel cell stack and the gas flow panels are thermally integrated. Thus, as the inlet oxidant gas temperature of the oxidant gas entering the gas flow panel increases, for a given higher outlet temperature of the oxidant gas exiting from the gas flow panel, the amount of heat transferred from the fuel cell stack to the gas flow panel is reduced. Consequently, lower inlet oxidant gas temperatures relative to the operating temperature of the fuel cell stack are required to maintain the same average stack temperature at steady state. The dimensional characteristics of the solid oxide fuel cell system of this invention provide a unique operating condition where the outlet oxidant gas temperature from the gas flow panel(s) matches the oxidant temperature of the oxidant flowing into the fuel cell stack. At this unique operating condition, supplemental heating of the oxidant between the oxidant gas outlet flow manifold 16 or 17 and the fuel cell stack 10 is not necessary.

In addition, at this operating condition as indicated by FIG. 5, the system of this invention, i.e. combined gas flow panel and fuel cell stack, referred to herein as a stack module, becomes truly modular and the scale-up of the module is simplified. Modularity of the system of this invention is dependent upon variations of the gas flow panel with oxidant utilization, electric load, fuel cell stack and gas flow panel dimensions, heat loss from the stack and other factors.

Figure 6:
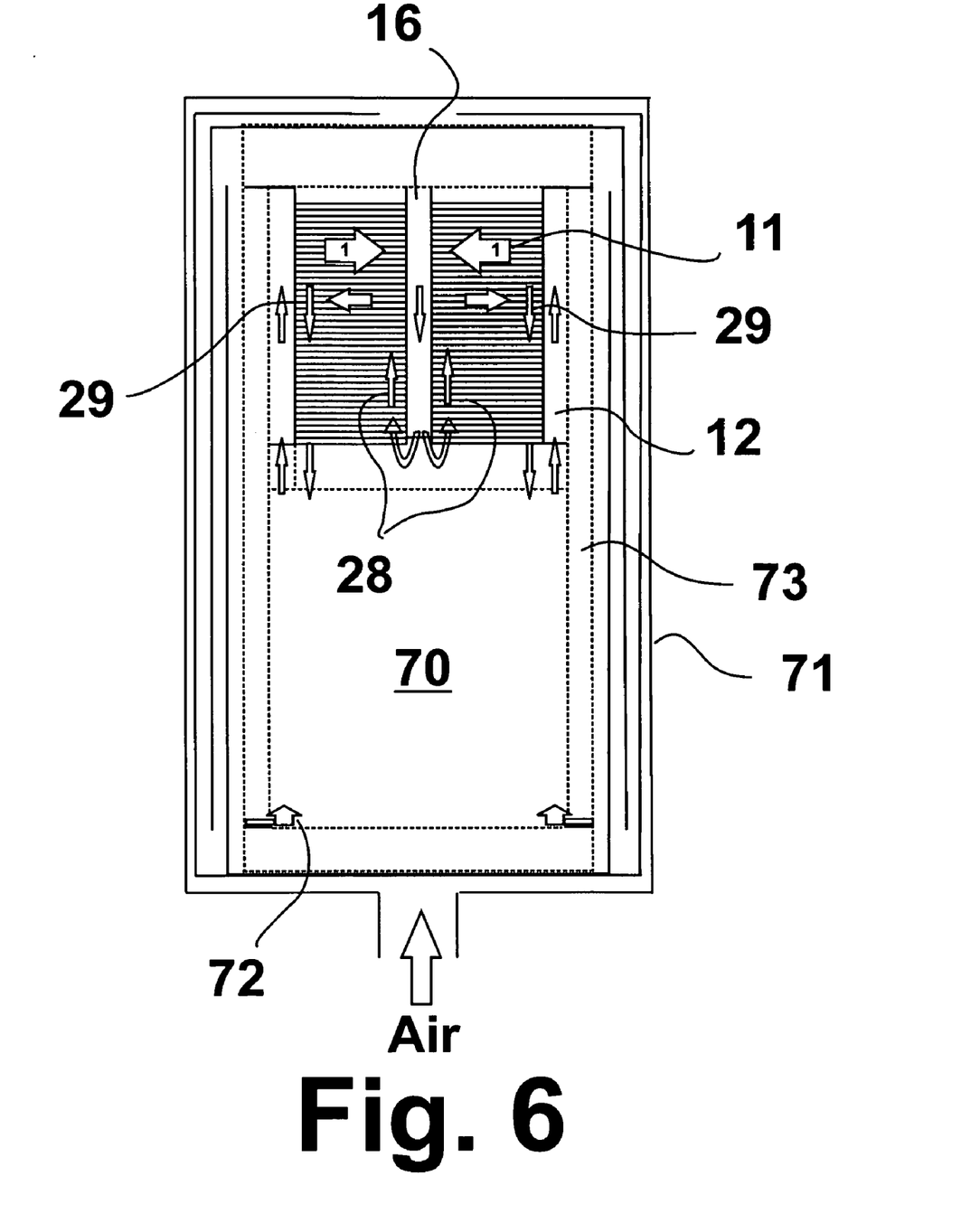
FIG. 6 is a lateral view of the multi-stack system shown in FIG. 5.
Figure 7:
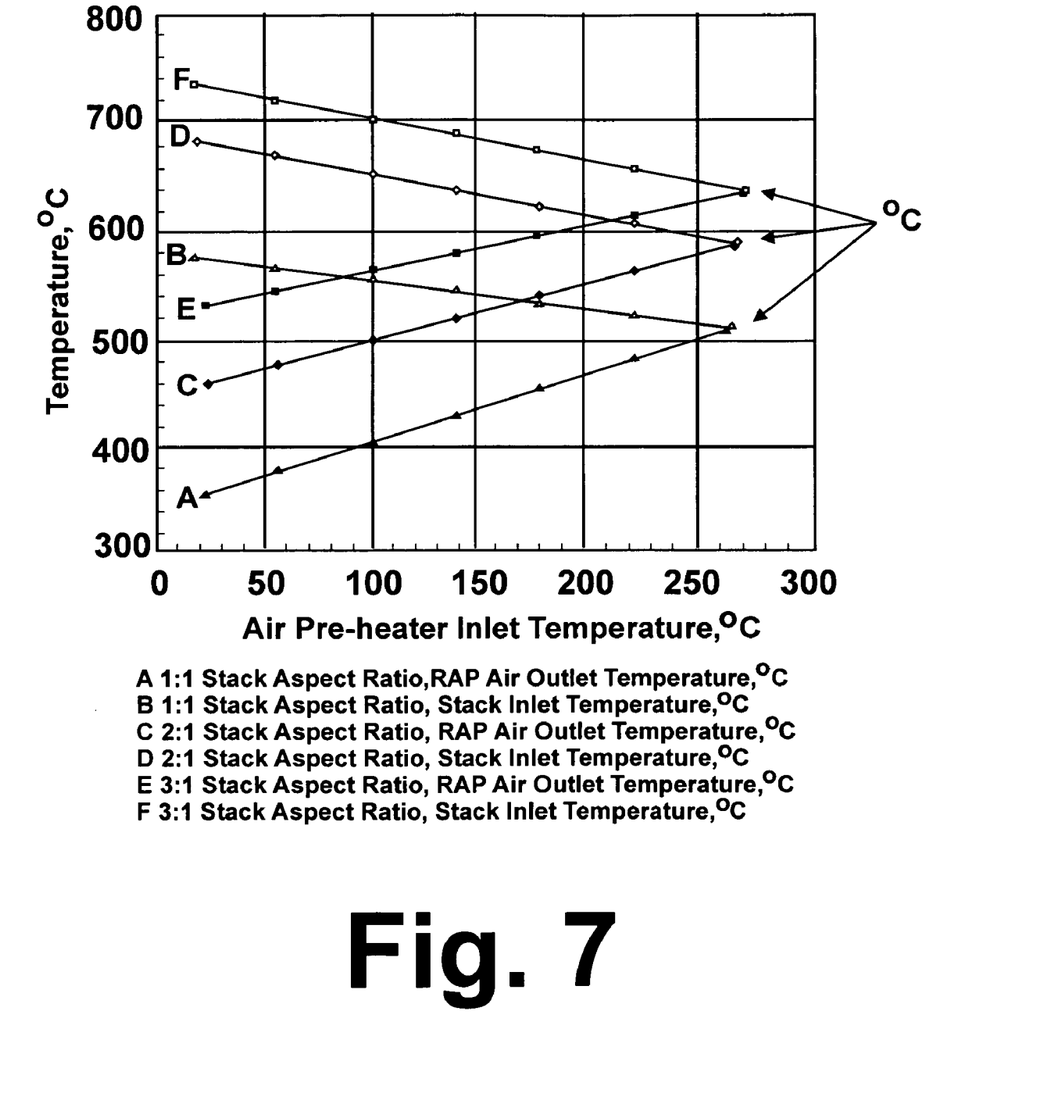
FIG. 7 is a diagram showing the effect of aspect ratio on temperatures related to stack and air preheater panel performance.

FIG. 5 shows an exemplary implementation of a system in accordance with one embodiment of this invention comprising a plurality of stack modules with stacks having internal manifolding and gas flow panels used only for air preheating. As shown, four stack modules are placed in a module enclosure 60. Each stack module comprises an internal manifolded fuel cell stack 51 and two gas flow panels 55, 56 facing each stack 51. One of the two gas flow panels 55 is disposed on the fuel gas inlet side 30 of the stack and the other gas flow panel 56 is disposed on the exhaust gas outlet side 31, also sometimes referred to herein as the fuel gas outlet side. Insulating strips or inserts 49 made of a suitable thermal and electrically insulating material such as mica or lava refractory separate the stack walls from the panel front walls. The insulating strips may also be used to prevent the mixing of cold oxidant at the process gas inlet flow manifold 12 with heated oxidant in the process gas outlet flow manifold 16. Both the process gas inlet flow manifold 12 and the process gas outlet flow manifold 16 are connected to a common stack plenum 70 as shown in FIG. 6.

The use of gas flow panels in accordance with the system of this invention improves operation of the fuel cell system by enabling a compact system size and limiting heat losses, both critical for small-scale and self-sustainable stack operation. In accordance with one embodiment of this invention comprising stacks with internal manifolding, shown in FIG. 6, air from a blower undergoes initial pre-heating in a system of annulus compartments 71 and enters common process compartment or stack plenum 70 by means of a ducted flow 72. Insulation 73 surrounding the stack modules allows accelerated reduction of temperatures and minimization of heat losses from the process unit. The common process compartment 70 serves all necessary process functionality outside of the stack modules disposed in the top portion of the unit. The oxidant leaves the common process compartment 70 and flows through the oxidant gas inlet flow manifold 12 into the gas flow panel in which it is heated. The heated oxidant from the gas flow panel is collected in the oxidant gas outlet flow manifold 16 and redirected to stack oxidant inlet flow manifolds 28. Excess oxidant exits from the stack through an oxidant gas outlet 29 and enters common process compartment 70 where it supplies heat for the incoming ducted air stream and other process purposes.

The use of stack modules in accordance with this invention, made possible with the use of the gas flow panels and oxidant supplied to the oxidant gas inlet flow manifolds at the specific operating conditions previously described, allows full scalability of the stack modules, while all the remaining process functionality (e.g., pre-reforming not conducted with panels, initial oxidant pre-heating, and burner operation) is combined in the common process compartment 70. Various simplifications in manifolding and reductions in the number of panels per stack are possible in multiple stack module arrays.

The start-up and shutdown procedure for the integrated stack module of this invention is similar to the procedure for a stand-alone stack. When flowing gases heat the stack module during start-up, the gas flow panels allow faster heating of the stack. The gas flow panels surrounding the stack(s) minimize heat loss from the stack and thermally radiate heat to adjacent stack sidewalls. The hot gases in the stand-alone stack flow only through the active (current-generating) volume and flow distribution ducting. For some stacks, the active volume may represent less than 50% of the total stack volume. The use of gas flow panels also leads to more uniform heating of the stack as stack temperature increases. An external fuel burner or electric heater can also provide some or all of the heat necessary for the stack module start-up.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:

1. An apparatus for generating electricity comprising:
a generally planar, rectangular solid oxide fuel cell stack having a plurality of fuel cell units, each said fuel cell unit comprising an anode electrode, a cathode electrode and an electrolyte disposed there between, at least one bipolar separator plate disposed between said anode electrode of one said fuel cell unit and said cathode electrode of an adjacent said fuel cell unit, oxidant delivery means for delivering oxidant to said cathode electrode, fuel delivery means for delivering fuel to said anode electrode, anode exhaust gas removal means for removing anode exhaust gases from said solid oxide fuel cell stack, and cathode exhaust gas removal means for removing cathode exhaust gases from said solid oxide fuel cell stack, at least one of said oxidant delivery means and said fuel delivery means comprising an internal manifold; and
said oxidant delivery means comprising at least one ducted gas flow panel disposed proximate said fuel cell stack and configured in combination with said fuel cell stack to maintain said fuel cell stack in an operational condition without supplemental heating of the oxidant after entering said at least one ducted gas flow panel.

2. An apparatus in accordance with claim 1, wherein said at least one ducted gas flow panel comprises a front wall facing said solid oxide fuel cell stack, a back wall spaced apart from and substantially parallel to said front wall and facing away from said solid oxide fuel cell stack, said back wall connected to said front wall and forming at least one oxidant flow duct between said front wall and said back wall having an oxidant inlet and an oxidant outlet.

3. An apparatus in accordance with claim 2, wherein said at least one ducted gas flow panel is constructed of a material having a thermal emissivity of at least about 0.3.

4. An apparatus in accordance with claim 3, wherein said material has a thermal emissivity in a range of about 0.3 to about 1.0.

5. An apparatus in accordance with claim 2, wherein a distance between said front wall and said back wall is in a range of about 0.25 cm to about 1.25 cm.

6. An apparatus in accordance with claim 2, wherein said at least one ducted gas flow panel is disposed at a distance from said solid oxide fuel cell stack in a range of about 0.25 cm to about 1.25 cm.

7. An apparatus in accordance with claim 2, wherein said at least one oxidant flow duct is oriented to provide oxidant flow in a direction substantially perpendicular to a stacking direction of said solid oxide fuel cell stack.

8. An apparatus in accordance with claim 1, wherein said at least one ducted gas flow panel is adapted to provide an oxidant temperature increase of up to about 400° C.

9. An apparatus in accordance with claim 1, wherein said oxidant delivery means comprises a plurality of said ducted gas flow panels, at least one of said ducted gas flow panels being disposed proximate a fuel inlet side of said solid oxide fuel cell stack and at least one of said ducted gas flow panels being disposed proximate an anode exhaust gas outlet side of said solid oxide fuel cell stack.

10. An apparatus in accordance with claim 1 further comprising at least one oxidant preheat burner adapted to preheat said oxidant prior to entering said at least one ducted gas flow panel.

11. An apparatus in accordance with claim 1, wherein said solid oxide fuel cell stack is adapted to adjust said operational condition to a new operational condition by one of self-adjustment of an operating temperature of said solid oxide fuel cell stack while maintaining oxidant temperature of oxidant entering said at least one ducted gas flow panel constant and adjustment of said oxidant temperature entering said at least one ducted gas flow panel while maintaining a stack temperature of said solid oxide fuel cell stack substantially constant.

12. An apparatus in accordance with claim 2, wherein said at least one ducted gas flow panel forms a plurality of said oxidant flow ducts.

13. An apparatus in accordance with claim 12, wherein at least one of said oxidant flow ducts contains thermal insulation.

14. An apparatus in accordance with claim 12, wherein at least one of said oxidant flow ducts contains a removable, functional insert adapted to at least one of control the direction of flow and enhance heat transfer.

15. An apparatus in accordance with claim 12, wherein a wall of at least one of said oxidant flow ducts has a form selected from the group consisting of smooth, ribbed, finned, bridged and combinations thereof.

16. An apparatus in accordance with claim 1 further comprising at least one additional ducted gas flow panel having at least one gas flow duct disposed proximate said fuel cell stack.

17. An apparatus in accordance with claim 16, wherein at least one reforming catalyst is disposed within said at least one gas flow duct.

18. An apparatus in accordance with claim 17, wherein said at least one additional ducted gas flow panel is disposed on an oxidant outlet side of said solid oxide fuel cell stack.

19. An apparatus in accordance with claim 1 further comprising a plurality of electrically insulating strips disposed between said solid oxide fuel cell stack and said at least one ducted gas flow panel.

20. An apparatus in accordance with claim 1, wherein said at least one ducted gas flow panel is at least equal in size to a side of said solid oxide fuel cell stack.

21. An apparatus in accordance with claim 1 further comprising a plurality of spaced apart said solid oxide fuel cell stacks with said at least one ducted gas flow panel disposed between said spaced apart solid oxide fuel cell stacks.

22. In a solid oxide fuel cell system comprising at least one solid oxide fuel cell stack having a plurality of solid oxide fuel cell units having an anode electrode, a cathode electrode and an electrolyte disposed there between, said at least one solid oxide fuel cell stack having a fuel gas inlet side, an oxidant gas inlet side, a reaction products outlet side disposed opposite said fuel gas inlet side, and an excess oxidant outlet side disposed opposite said oxidant gas inlet side, a method for thermal management of said system comprising the steps of:

positioning at least one substantially planar ducted gas flow panel proximate said fuel gas inlet side, said at least one substantially planar ducted gas flow panel having dimensions and orientation with respect to said fuel gas inlet side whereby oxidant flowing through said gas flow panel is heated to a temperature suitable for maintaining said at least one solid oxide fuel cell stack in an operational condition without supplemental heating of said oxidant after entering said at least one ducted gas flow panel;

introducing said fuel gas into said at least one fuel cell stack;

introducing said oxidant into at least one duct of said ducted gas flow panel, heating said oxidant to form heated oxidant; and directing said heated oxidant from said at least one ducted gas flow panel through said oxidant gas inlet side to said cathode electrode without supplemental heating of said oxidant between said at least one ducted gas flow panel and said oxidant gas inlet side.

23. A method in accordance with claim 22, wherein said temperature of said oxidant is increased up to about 400° C. in said at least one ducted gas flow panel.

24. A method in accordance with claim 22, wherein said fuel gas and said oxidant are introduced into said at least one solid oxide fuel cell stack in a cross-flow arrangement.

25. A method in accordance with claim 22, wherein said at least one duct is oriented to provide flow of said oxidant in a direction perpendicular to a stacking direction of said at least one fuel cell stack.

26. A method in accordance with claim 22, wherein said oxidant is preheated prior to being introduced into said at least one gas flow panel.

27. A method in accordance with claim 22, wherein said fuel gas is a reformed fuel.

28. A method in accordance with claim 27, wherein said reformed fuel is produced in a second gas flow panel disposed proximate said at least one solid oxide fuel cell stack.

29. A method in accordance with claim 25, wherein said oxidant flow is substantially parallel to a direction of a declining stack hardware temperature on a stack sidewall facing said gas flow panel.

* * * * *